Nov. 27, 1923.
W. C. SCHLITZER
1,475,515
LENS TESTING INSTRUMENT
Filed Feb. 6, 1922   2 Sheets-Sheet 1
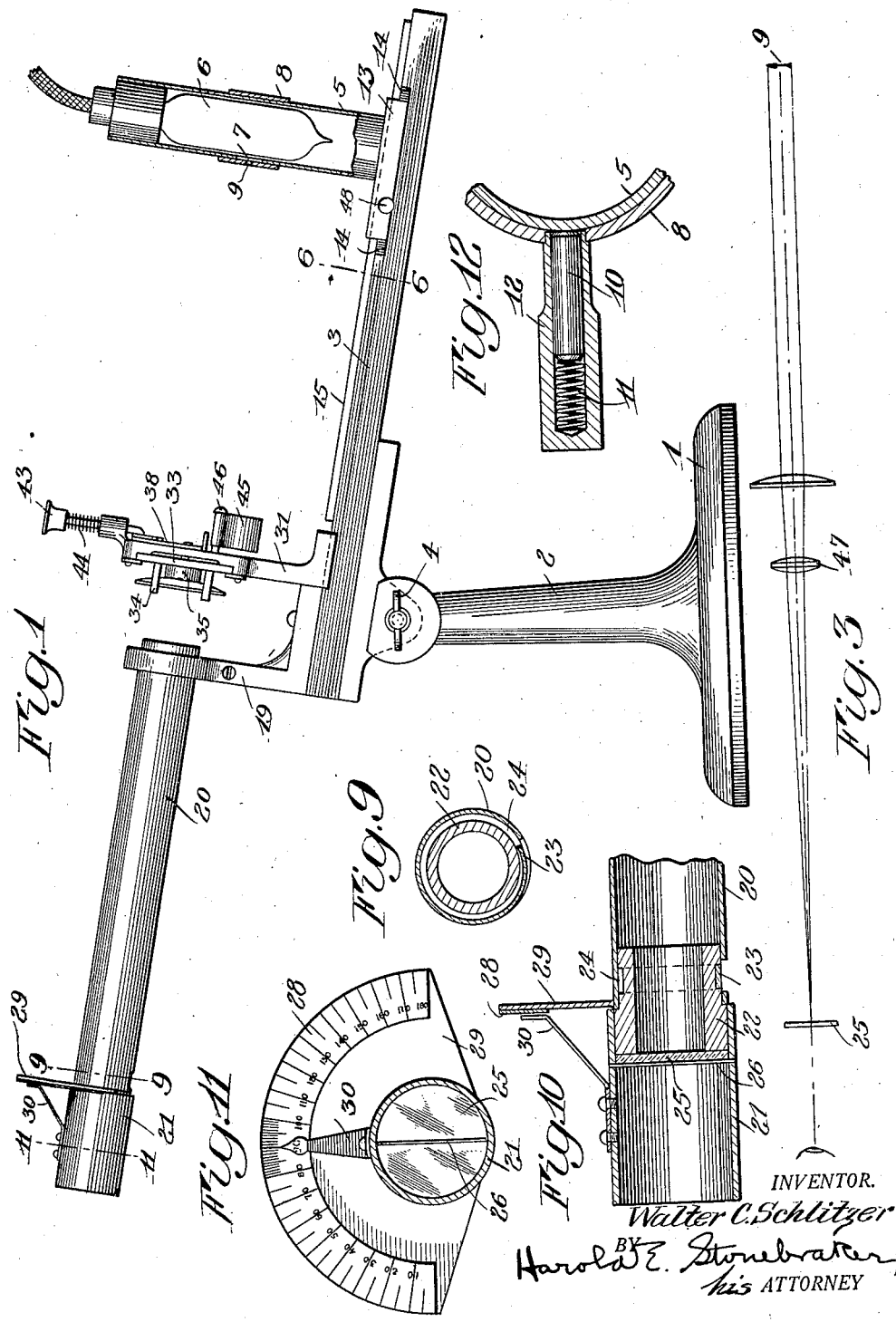
INVENTOR.
Walter C. Schlitzer
BY Harold E. Stonebraker
his ATTORNEY Nov. 27, 1923.
W. C. SCHLITZER
LENS TESTING INSTRUMENT
Filed Feb. 6, 1922
1,475,515
2 Sheets-Sheet 2
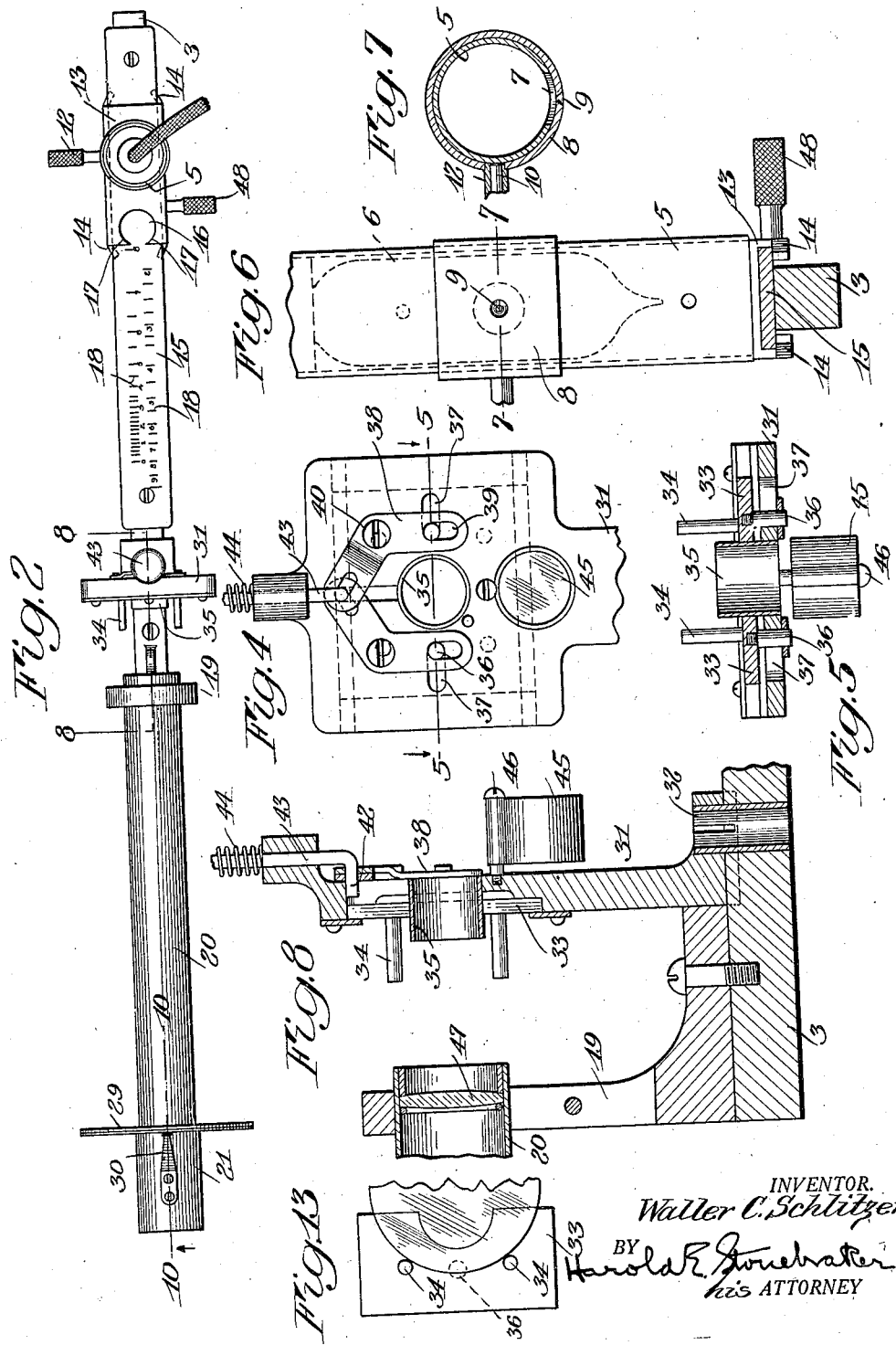
INVENTOR.
Walter C. Schlitzer
BY Harold E. Stonebraker
his ATTORNEY Patented Nov. 27, 1923.

1,475,515

UNITED STATES PATENT OFFICE.

WALTER C. SCHLITZER, OF ROCHESTER, NEW YORK.

LENS-TESTING INSTRUMENT.

Application filed February 6, 1922. Serial No. 534,610.

*To all whom it may concern:*

Be it known that I, WALTER C. SCHLITZER, a citizen of the United States of America, residing at Rochester, in the county of Monroe and State of New York, have invented certain new and useful Improvements in Lens-Testing Instruments, of which the following is a specification.

My invention relates to a lens testing instrument, and has for its purpose to provide mechanism for determining accurately the focal length and cylindrical axis of a lens.

The primary object of the improvement is to afford a practical and simple structure that can be economically manufactured and easily operated.

A further purpose of the invention is to provide a device with a minimum number of parts necessary for accomplishing the intended purpose in an efficient manner.

To these and other ends, the invention consists in the details and combinations of parts that will appear clearly from the following description in conjunction with the accompanying drawings, the novel features being pointed out in the claims following the description.

In the drawings:

Figure 1 is a side elevation of an instrument incorporating a preferred embodiment of the invention;

Figure 2 is a plan view of the same;

Figure 3 is a diagram of the optical system of the instrument;

Figure 4 is a rear elevation of the supporting means for the test lens;

Figure 5 is a horizontal sectional view on line 5—5 of Figure 4;

Figure 6 is a vertical sectional view on line 6—6 of Figure 1, with the lamp housing in elevation;

Figure 7 is a horizontal sectional view on line 7—7 of Figure 6;

Figure 8 is a vertical sectional view on the line 8—8 of Figure 2;

Figure 9 is a sectional view on the line 9—9 of Figure 1;

Figure 10 is a sectional view on the line 10—10 of Figure 2;

Figure 11 is a sectional view on the line 11—11 of Figure 1;

Figure 12 is an enlarged sectional view on the line 7—7 —of Figure 6, and

Figure 13 is an enlarged elevation of a portion of the lens supporting means, showing a lens in position but partially broken away.

In the illustrated embodiment, 1 designates a base upon which is mounted a standard 2, while 3 is a beam pivotally attached to the standard and held in adjusted position by a wing nut 4, so that it can be positioned at any angle to the horizontal, to bring the sight tube at a convenient position with reference to the eye of the operator. The sight tube is attached at one end of the beam 3, and the test object and lamp housing at the other end, the test lens being located therebetween, and I will now describe these parts in detail.

The lamp housing preferably comprises a vertically arranged tube or hollow cylinder 5, which is adapted to receive a lamp 6 in a vertical position so as to provide a maximum amount of light for the test object. The lamp housing 5 has an opening 7 at one side thereof, and 8 designates a collar that is frictionally retained on the housing over the opening 7 and is adjustable with reference to said opening. The collar 8 contains a light emitting pin-opening 9, which permits rays of light to pass from the lamp housing directly onto the test lens, to be referred to presently, and by adjustment of the collar 8, it is possible to shift the opening 9 in order that the light rays may be properly centered on the test lens. The collar 8 is held in adjustable and frictional engagement on the lamp housing 5 by a pin 10 actuated by a spring 11 against the housing, both said pin and spring being carried in a hollow handle member 12 carried by the collar, as shown in Figure 12.

The lamp housing 5 is mounted on a plate or carrier 13, which has flanges 14 underlying the guide plate 15 which forms a part of the beam 3, the carrier 13 being slidable along the beam until the proper focus of the test object on the image screen is obtained. The plate 15 is provided on its upper surface with proper focal length indicia, and the carrier 13 is cut away at 16 to afford indicators 17, which cooperate with the indicia 18 to show the focal length of a lens under test, one of said indicators cooperating with one set of markings for positive lenses, and the other indicator and markings being for negative lenses.

Attached to one end of the beam 3 is a bracket 19 to which the sight tube is secured. The sight tube comprises a fixed sleeve 20 rigidly attached to the bracket 19, and a second sleeve 21 which is rotatively attached to the fixed sleeve 20. To accomplish this, the adjustable sleeve 21 has fixed to its inner end a collar 22, which telescopes within the fixed sleeve 20 and is rotatable with reference thereto. Interlocking means are provided between the sleeves 20 and 21, preferably consisting of a spring tongue 23 struck out and bent inwardly from the sleeve 20 and engaging a groove or recess 24 in the collar 22. 25 designates an image screen, preferably of ground glass or the like, held within the adjustable sleeve 21 against the collar 22 by means of a wire 26 which is fixedly secured to the sleeve 21, and contacts with the image screen, the wire 26 serving also the additional function of determining the axis of the lens.

In operating the device, the screen 25 is rotated, by turning the sleeve 21, until the image, consisting of a line formed by the spot of light passing through the test lens, appears parallel to the line 26. The angle of the cylindrical axis is determinable by means of a scale 28, which is preferably arranged on a plate 29 carried by the stationary sleeve 20, while the adjustable sleeve 21 carries a suitable indicator 30 cooperating with the stationary scale 28, the proper axis determining indicia or degree markings being disposed on the scale 28.

The means for supporting the test lens includes a bracket 31 removably engaging a hollow, split post 32 carried by the beam 3. Slidably mounted on bracket 31 are plates 33, having lens engaging pins 34, and cut away at the center so as to fit against the collar 35 when in their normal or innermost position. When in testing position, the lens is positioned against the end of collar 35, as shown in Figure 1, being held by the pins 34 engaging its edge. Each plate 33 carries operating pins 36, projecting through openings 37 to the opposite side of bracket 31, where they are engaged by bell-crank levers 38, slotted at 39 and pivoted to the bracket at 40. The opposite end of each bell-crank lever is also slotted at 41 to receive the end 42 of a controlling plunger 43, which is held in uppermost position by a spring 44. To spread the pins 34 when inserting a lens, the plunger 43 is depressed, swinging the bell-crank levers 38 and moving the plates 33 outwardly, away from each other, all of said parts being restored to normal position by spring 44 when the plunger is released.

45 designates a supplemental lens mount pivoted on a post 46, and adapted to be swung into the longitudinal axis of the focal system when a negative lens is under test, as usual in this class of apparatus. 47 designates a condensing or focalizing lens fixedly arranged at the inner end of the sight tube, that is, at the inner end of the fixed sleeve 20, and serving to project the image from the test lens onto the image screen 25. The lens 47 is the only lens which the apparatus necessarily employs, in addition to the lens under test, when a positive lens is being examined, and by reference to Figure 3, it will be observed that the light rays pass from the pin opening or test object 9, directly to the test lens, whence they pass, converging slightly, to the condensing lens 47, the condensing lens 47 acting to project the image onto the image screen 25. 48 designates an operating handle mounted on the carrier 13, and preferably provided with frictional retaining means consisting of a spring actuated pin contacting with the beam 3, similar to the means previously described, and illustrated in Figure 12.

The invention is of an extremely simple and practical nature, and affords an accurate means for determining the focal length or cylindrical axis of a lens, and while I have shown the improvement in a preferred embodiment, it is susceptible of different modifications, and this application is intended to cover any changes or departures coming within the spirit of the improvement or the scope of the following claims.

I claim:

1. A lens testing instrument comprising means for supporting a test lens, a lamp housing located on one side of said lens supporting means and having an opening at one side thereof, a sleeve adjustable on the housing and positionable over said opening, the sleeve having a light emitting opening that is adjustable to proper relationship with the test lens and acts to project rays of light onto the test lens, a sight tube on the opposite side of the lens supporting means, an image screen within the tube, and a condensing lens between the image screen and lens supporting means.

2. The combination with a lens testing instrument, of means for supporting a lens consisting of a bracket, plates slidable laterally on said bracket toward and from each other, lens engaging members carried by said plates, bell-crank levers connected to said plates, and a vertically movable spring-controlled plunger connected to said bell-crank levers.

3. The combination with a lens testing instrument, of means for supporting a lens consisting of a pair of horizontally slidable plates, lens engaging members carried by said plates, operating pins mounted on the plates, bell-crank levers having slotted ends engaging said pins, the other ends of said bell-crank levers being slotted, and a vertically operable plunger engaging the last mentioned slotted ends.

4. The combination with a lens testing instrument, of means for supporting a lens consisting of a collar against which one surface of the test lens is positioned, a pair of slidable plates normally positioned against the sides of said collar, pivoted bell-crank levers connected to said plates, and a controlling plunger connected to said bell-crank levers.

In witness whereof, I have hereunto signed my name.

WALTER C. SCHLITZER.